United States Patent
Yang et al.

(10) Patent No.: US 10,841,646 B2
(45) Date of Patent: Nov. 17, 2020

(54) BROADCAST SIGNAL TRANSCEIVER AND TRANSMITTING/RECEIVING METHOD

(71) Applicant: LG ELECTRONICS INC., Seoul (KR)

(72) Inventors: Seungryul Yang, Seoul (KR); Minsung Kwak, Seoul (KR); Somi Park, Seoul (KR); Woosuk Ko, Seoul (KR); Sungryong Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/302,276

(22) PCT Filed: Apr. 11, 2017

(86) PCT No.: PCT/KR2017/003922
§ 371 (c)(1),
(2) Date: Nov. 16, 2018

(87) PCT Pub. No.: WO2017/200209
PCT Pub. Date: Nov. 23, 2017

(65) Prior Publication Data
US 2019/0313149 A1 Oct. 10, 2019

Related U.S. Application Data

(60) Provisional application No. 62/337,828, filed on May 17, 2016, provisional application No. 62/343,800, (Continued)

(51) Int. Cl.
*H04N 21/434* (2011.01)
*H04N 21/435* (2011.01)
*H04N 21/858* (2011.01)

(52) U.S. Cl.
CPC ....... *H04N 21/4345* (2013.01); *H04N 21/435* (2013.01); *H04N 21/858* (2013.01); *H04N 21/8586* (2013.01)

(58) Field of Classification Search
CPC .................................................. H04N 21/4345
See application file for complete search history.

(56) References Cited

U.S. PATENT DOCUMENTS

| | | | |
|---|---|---|---|
| 2010/0037258 A1* | 2/2010 | Chitturi | H04N 21/234318 725/39 |
| 2018/0048408 A1* | 2/2018 | Deshpande | H04H 60/72 |
| 2018/0139476 A1* | 5/2018 | Deshpande | H04N 21/435 |

FOREIGN PATENT DOCUMENTS

| | | |
|---|---|---|
| KR | 10-2010-0124966 A | 11/2010 |
| WO | WO 2016/036167 A1 | 3/2016 |

(Continued)

*Primary Examiner* — Michael H Hong
(74) *Attorney, Agent, or Firm* — Birch, Stewart, Kolasch & Birch, LLP

(57) ABSTRACT

A broadcast signal receiving method according to an embodiment of the present invention includes: receiving a broadcast signal; parsing service list table (SLT) information included in the broadcast signal; obtaining service layer signaling (SLS) information based on the SLT information; obtaining app signaling information based on the SLT information or the SLS information, the app signaling information including entry page information for an entry page that is loaded for an app-based service startup; and controlling an app based on the app signaling information.

16 Claims, 13 Drawing Sheets

Related U.S. Application Data filed on May 31, 2016, provisional application No. 62/416,686, filed on Nov. 2, 2016.

(56) References Cited

FOREIGN PATENT DOCUMENTS

| | | |
|---|---|---|
| WO | WO 2016/043548 A1 | 3/2016 |
| WO | WO 2016/064151 A1 | 4/2016 |

\* cited by examiner

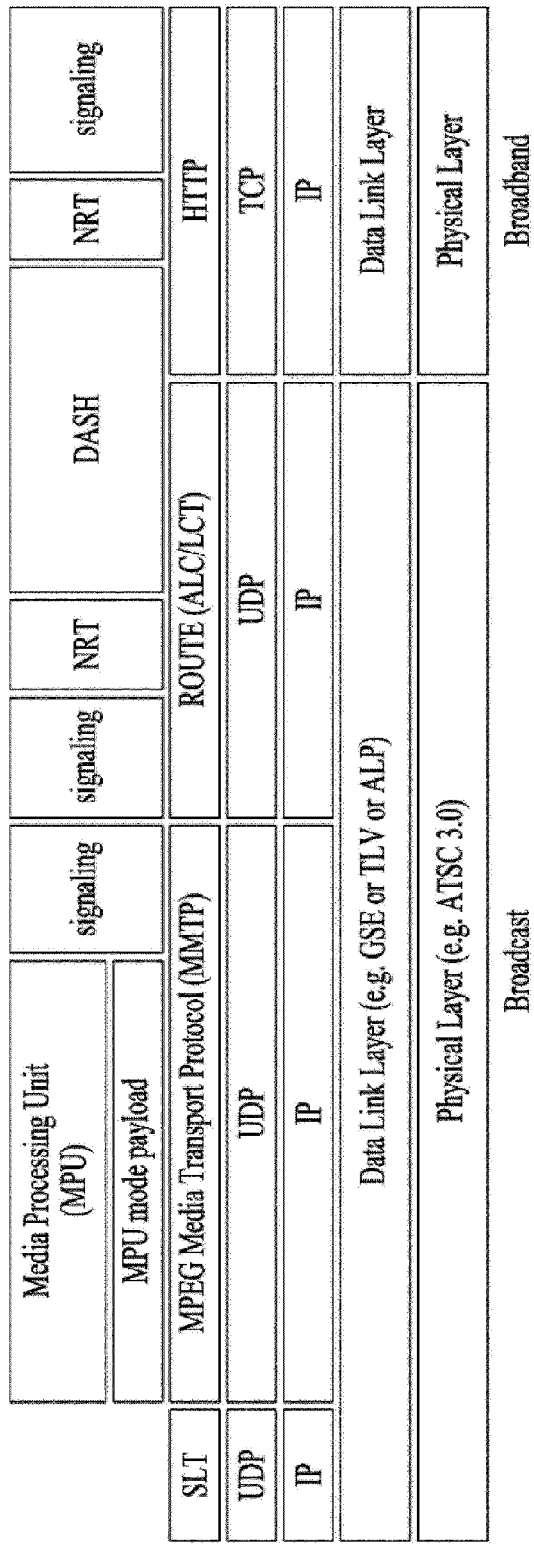
[FIG. 1]

[FIG. 2]
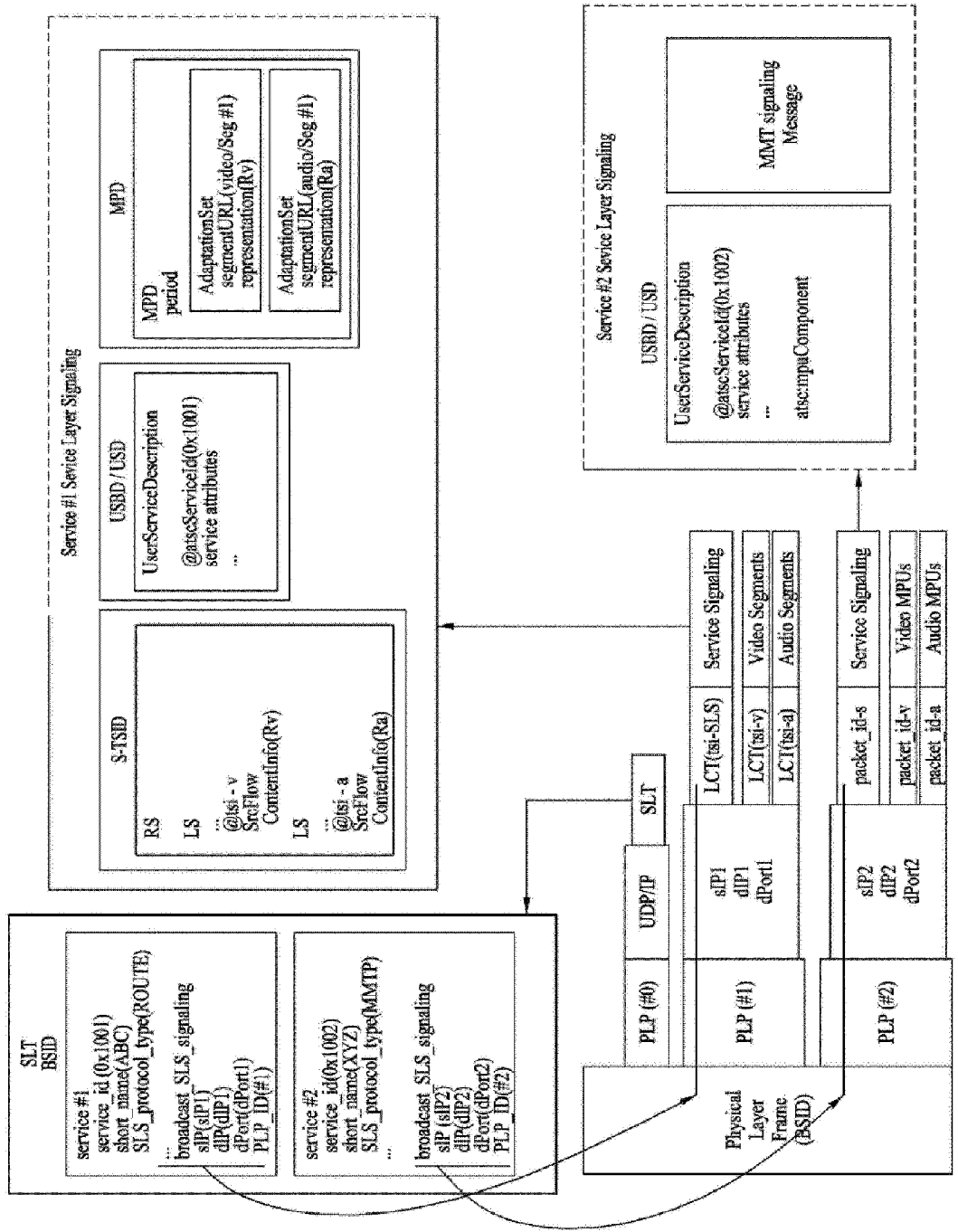

[FIG. 3]

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

[FIG. 4]

| Element or Attribute Name | | | Use | Data Type |
|---|---|---|---|---|
| bundleDescription | | | | |
|   userServiceDescription | | | | |
| | @globalServiceID | | 1 | anyURL |
| | @serviceID | | 1 | unsignedShort |
| | @serviceStatus | | 0..1 | boolean |
| | @fullMPDUri | | 1 | anyURL |
| | @sTSIDUri | | 1 | anyURL |
| | name | | 0..N | string |
| | | @lang | 1 | language |
| | serviceLanguage | | 0..N | language |
| | capabilityCode | | 0..1 | string |
| | deliveryMethod | | 1..N | |
| | | broadcastAppService | 1..N | |
| | |   basePattern | 1..N | string |
| | | unicastAppService | 0..N | |
| | |   basePattern | 1..N | string |

~t4010

| Element or Attribute Name | | Use | Data Type |
|---|---|---|---|
| S-TSID | | | |
|   @serviceID | | 1 | unsignedShort |
|   RS | | 1..N | |
| | @bsid | 0..1 | unsignedShort |
| | @slpAddr | 0..1 | string |
| | @dIpAddr | 0..1 | string |
| | @dport | 0..1 | unsignedShort |
| | @PLPID | 0..1 | unsignedByte |
| | LS | 1..N | |
| |   @tsi | 1 | unsignedInt |
| |   @PLPID | 0..1 | unsignedByte |
| |   @bw | 0..1 | unsignedInt |
| |   @startTime | 0..1 | dateTime |
| |   @endTime | 0..1 | dateTime |
| |   ScrFlow | 0..1 | scrFlowType |
| |   RepairFlow | 0..1 | rprFlowType | t4020

[FIG. 5]

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

[FIG. 6]
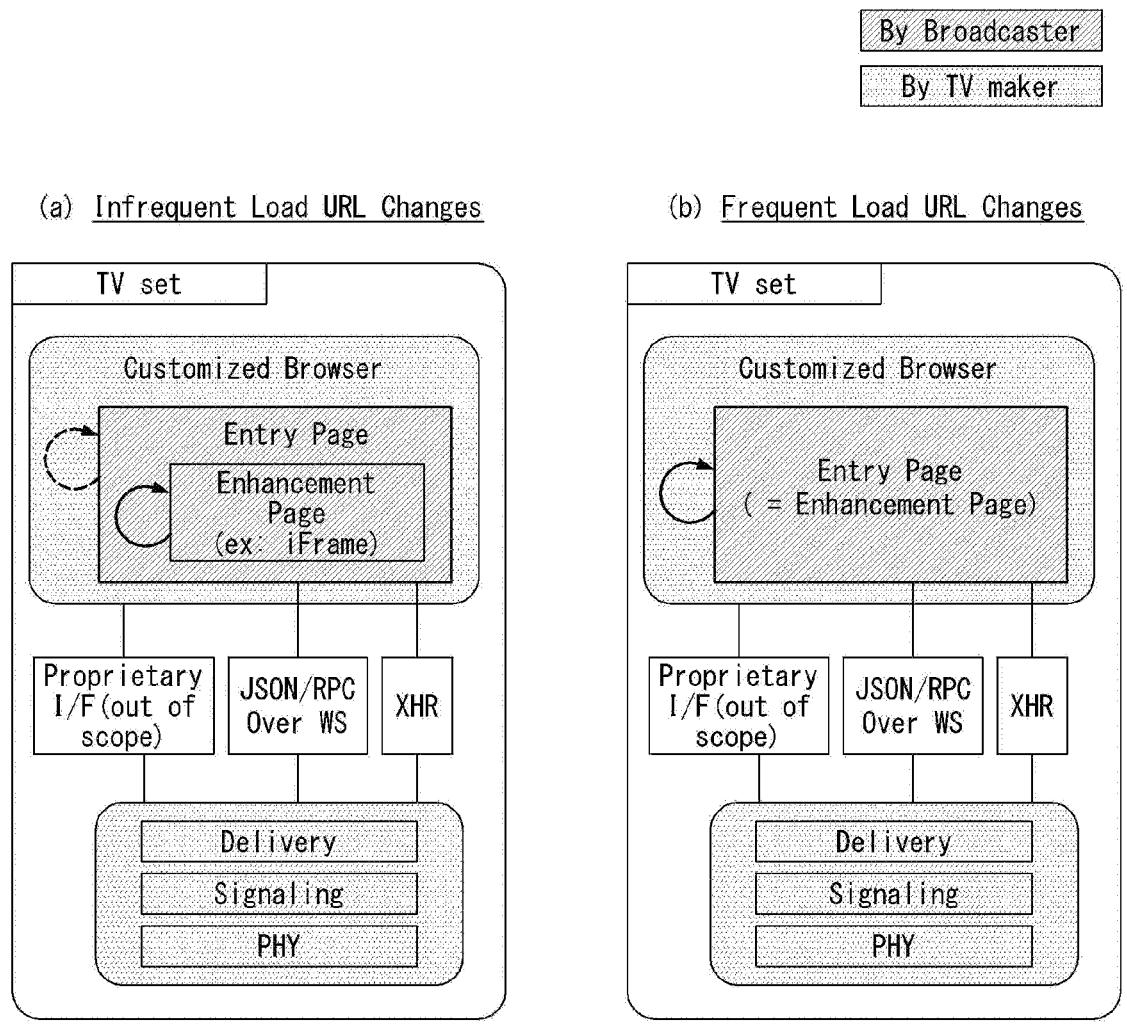

[FIG. 7]
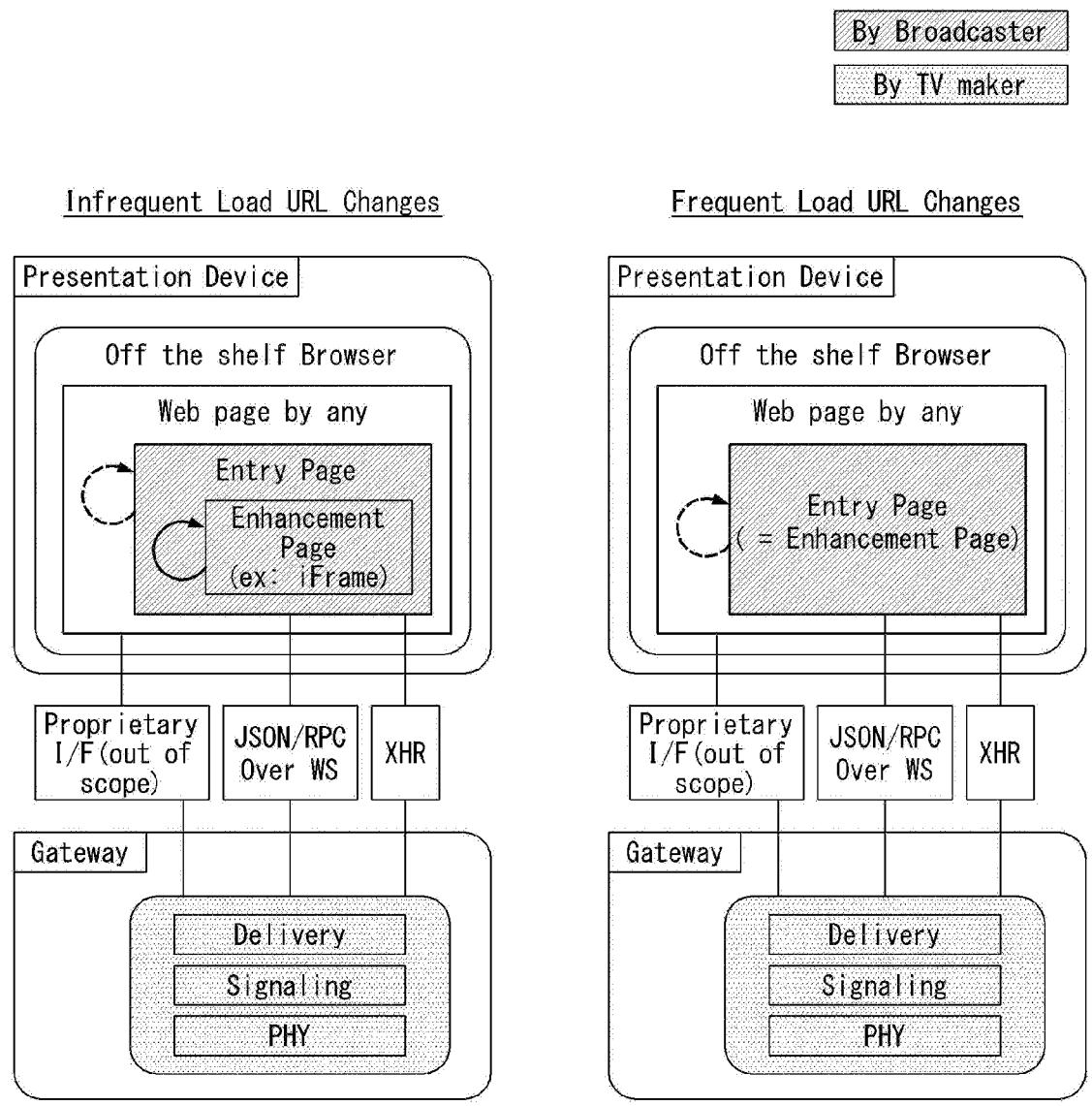

[FIG. 8]

| Element Name | | | | Cardinality | Data Type | Description |
|---|---|---|---|---|---|---|
| EntryPageCollection | | | | 1 | | Includes HTML entry page collection elements. |
| | HTMLEntryPage | | | 1..N | | Contains properties of Entry page. |
| | | @specVersion | | 0..1 | string | Indicates specification version for this HTML page. This is for extensibility of the standards. Default value is "3.0" indicating the current release specification |
| | | @requiredCapabilities | | 0..1 | string | Device capabilities needed for meaningful rendition of the entry page |
| | | EntryLocation | | 1..2 | anyURI | The URL path component to the entry point of HTML pages. If the (at least one) URL changes, it indicates a new URL for Entry Location is available. If two Entry Locations are appeared, one shall be for broadcast transport and the other shall be for broadband transport. |
| | | | @transport | 1 | string | "broadcast" or "broadband" |
| | | TimeSlotInfo | | 0..N | | Time interval during which the application can be acquired |
| | | | @timeslot_start | 1 | date Time | Start time of the time slot |
| | | | @timeslot_length | 1 | unsigned Short | Length of the time slot in seconds. |
| | | | @acquisition_time | 1 | unsigned Short | Minimum time interval needed to guarantee acquisition of the application |
| | | | @repeat_period | 1 | unsigned Short | Period of repetition of the time slot in seconds. |
| | | validFrom | | R | string (date-time) | When the HTML Pages Collection is valid from |
| | | validUntil | | O | string (date-time) | Up to when the HTML Pages Collection is valid until |
| | | Cache Recommendation | | O | boolean | Indicates whether or not caching the HTML page accessed via the Entry Location is recommended. <br> - 0: recommended <br> - 1: not recommended |

[FIG. 9]

| Element Name | | | Cardinality | Data Type | Description |
|---|---|---|---|---|---|
| HELD | | | 1 | | Includes HTML entry page collection elements. |
| | HTMLEntryPage | | 1..N | | Contains properties of the entry page. |
| | | @requiredCapabilities | 0..1 | xs:string | Device capabilities needed for meaningful rendition of the entry page (as defined in the A/332 "Service Announcement" [xx]) |
| | | @appRendering | 0..1 | xs:boolean | In a linear service, indicates a broadcaster request that the broadcaster application be allowed to render the video of the Service |
| | | @entryURL | 1 | xs:anyURI | URL of the entry page of the application |
| | | @alternateEntryURL | 0..1 | xs:anyURI | An alternate broadband path to the same HTML page indicated in @entryURL. |
| | | @packageURL | 0..1 | xs:anyURI | Indicates, if present, the URL of a package containing the entry page, which has the Content-Location value given in @entryURL |
| | | @validFrom | 0..1 | xs:dateTime | Indicates that the page at @entryURL is to be loaded at the date and time of @validFrom, or at any time after the date and time of @validFrom and beforethe date and time of @validUntil when the service is selected. |
| | | @validUntil | 0..1 | xs:dateTime | Indicates that application at @entryURL is to be unloaded at the date and time of @validUntil. |
| | | AppContextID | 1..N | xs:string | Indicates a context ID for the application. The application is allowed to access application files which have the same AppContextID. |
| | | CoupledServices | 0..1 | xs:list | Provides a space-separated list of linear services sharing a common broadcaster application. |
| | | LCT | 0..N | | LCT channel which carries application files. |
| | | | @tsiRef | 1 | xs:unsignedInt | TSI value of an LCT channel in the ROUTE session |
| | | | DistributionWindow | 0..N | | Broadcast transmission interval of the application file or package. |
| | | | | @startTime | 1 | xs:unsignedInt | Beginning of the transmission interval. |
| | | | | @endTime | 1 | xs:unsignedInt | End of the transmission interval. |
| | | | FileURL | 1..N | anyURI | URL of the application file or package. |

[FIG. 10]

| Element Name | | Cardinality | Data Type | Description |
|---|---|---|---|---|
| EFDT | | | | Provides the details of the file delivery data in the form of the Extended FDT instance which includes nominal FDT instance parameters |
| | @version | 0..1 | unsignedByte | The version of this Extended FDT instance descriptor. |
| | @maxExpiresDelta | 0..1 | unsignedInt | Time interval for use in deriving the expiration time of the associated EFDT |
| | @maxTransportSize | 0..1 | unsignedInt | The maximum transport size of any object described by this EFDT. |
| | FileTemplate | 0..1 | string | Describes the means to generate the file URL, i.e. Content-Location attribute of the FDT). |
| | FDTParameters | 0..1 | fdt:FDT-InstanceType | Any parameters allowed in the FLUTE FDT instance |
| | AppContextID | 1..N | string | Indicates a context ID for an HTML page or a file which an HTML page can access to. An application (i.e., HTML page) is allowed to access to a file with a context ID which is same as one of the application. |

Assign a context ID to an application file delivered via broadcast.

[FIG. 11]
\<HTTP Response Header\>
```
HTTP/1.1 200 OK
CONTENT-LANGUAGE: ~~~
CONTENT-LENGTH: ~~~
CONTENT-TYPE: ~~~; charset=~~~
DATE: ~~~
...
AppContextID:
...
```
Assign a context ID to an application file delivered via broadcast.
[FIG. 12]
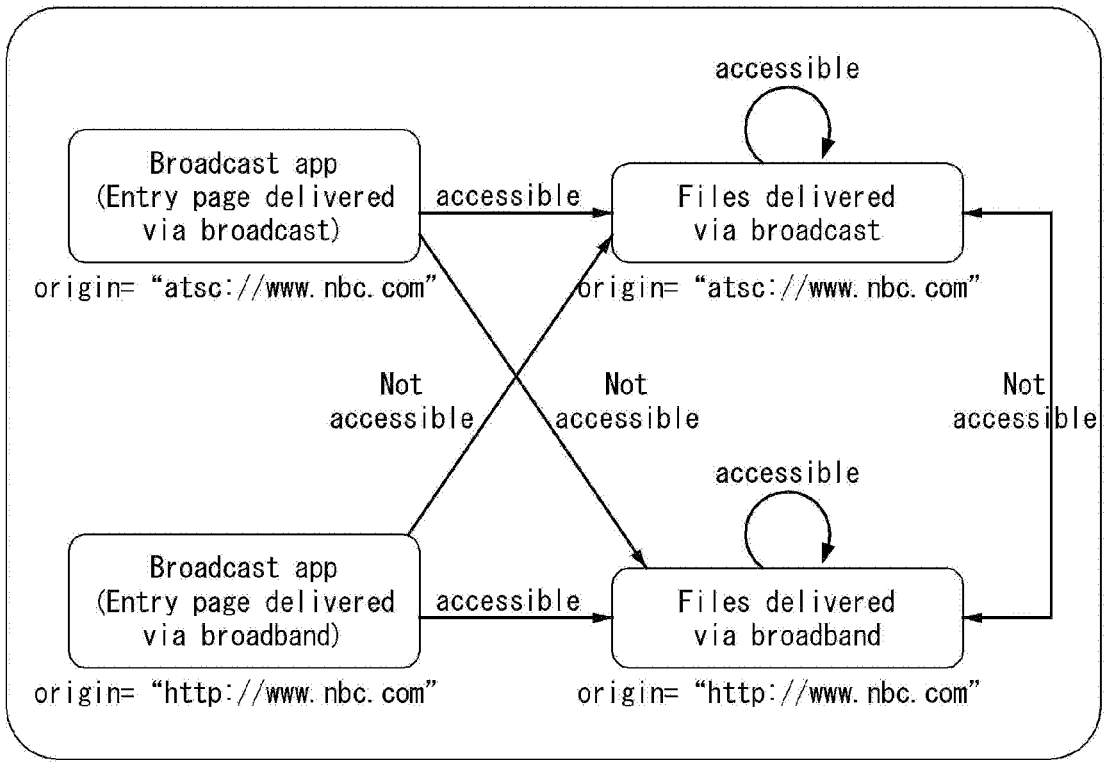

[FIG. 13]
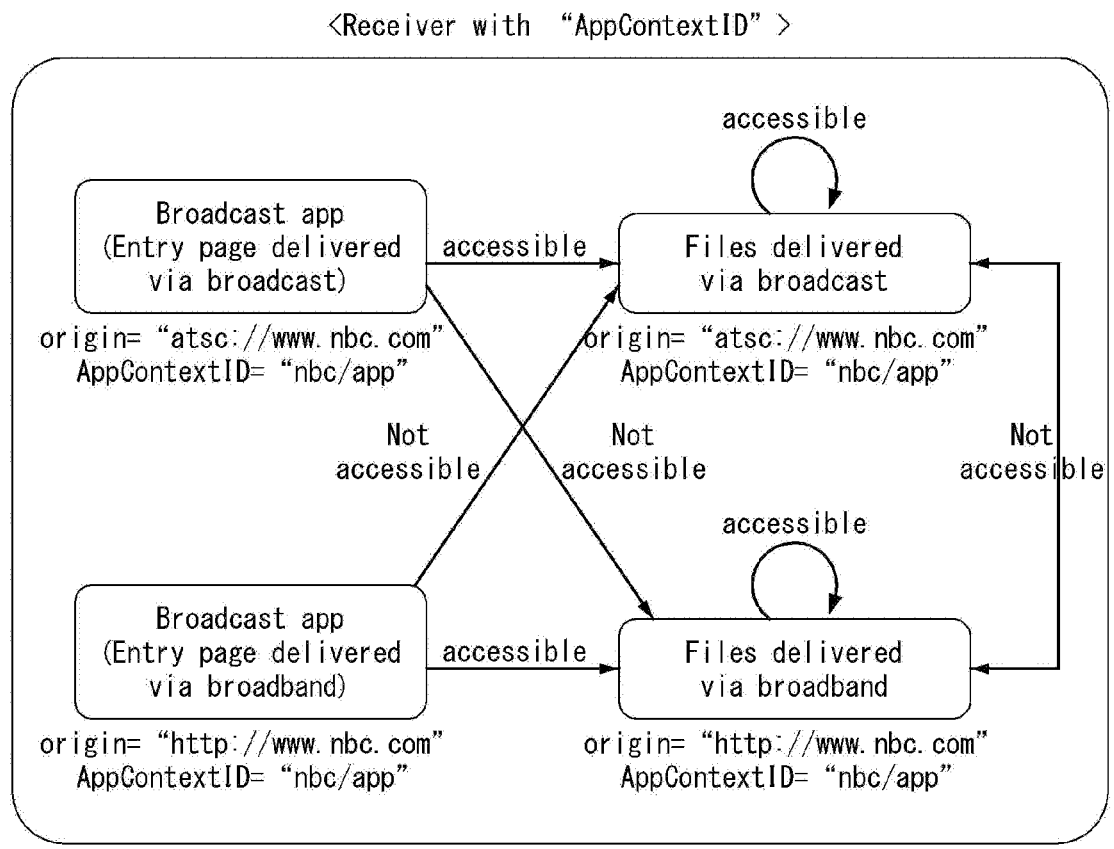
[FIG. 14]
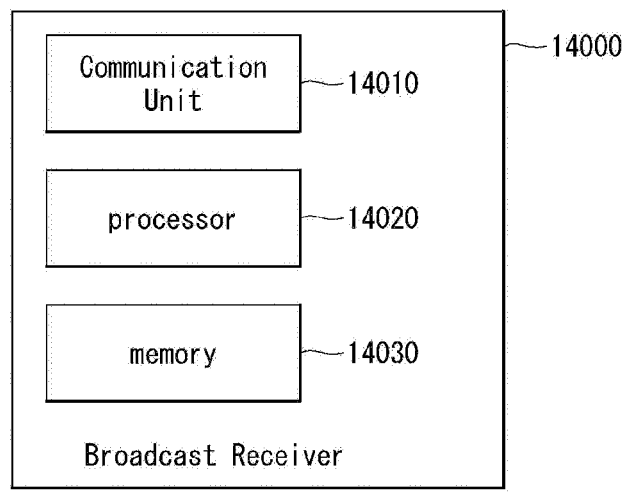

[FIG. 15]
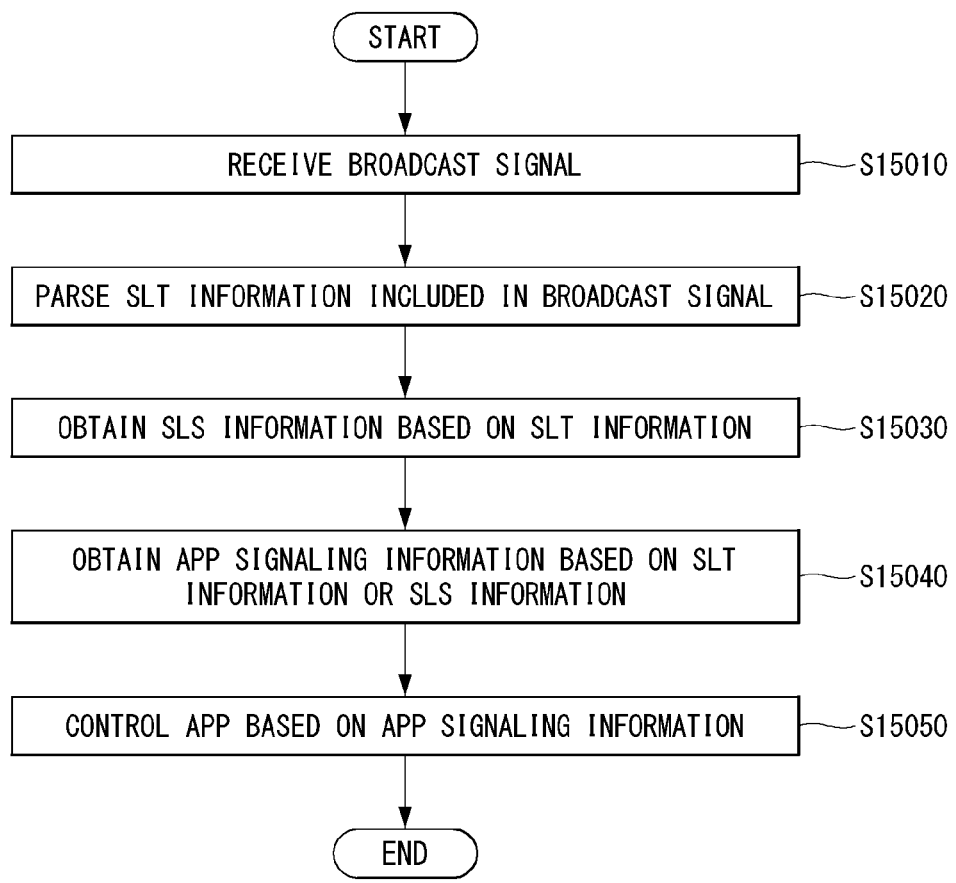

BROADCAST SIGNAL TRANSCEIVER AND TRANSMITTING/RECEIVING METHOD

CROSS REFERENCE TO RELATED APPLICATIONS

This application is the National Phase of PCT International Application No. PCT/KR2017/003922, filed on Apr. 11, 2017, which claims priority under 35 U.S.C. 119(e) to U.S. Provisional Application No. 62/337,828, filed on May 17, 2016, 62/343,800 filed on May 31, 2016 and 62/416,686 filed on Nov. 2, 2016, all of which are hereby expressly incorporated by reference into the present application.

TECHNICAL FIELD

The present invention relates to a broadcast signal transmitter, a broadcast signal receiver, a broadcast signal transmitting method, and a broadcast signal receiving method. In particular, the present invention relates to a method for transmitting app related signaling information by a broadcast signal transmitter and receiving app signaling information by a broadcast signal receiver and an app control method based thereon.

BACKGROUND ART

Along with cessation of transmission of an analog broadcast signal, various technologies for transmitting and receiving a digital broadcast signal are being developed. A digital broadcast signal may carry a larger amount of video or audio data than an analog broadcast signal and may further include various types of additional data as well as video or audio data.

DISCLOSURE

Technical Problem

A digital broadcast system may provide High Definition (HD) images, multi-channel audio, and various additional services. However, to operate digital broadcasting, network flexibility needs to be improved in consideration of data transfer efficiency for transmission of a large amount of data, robustness of a transmission and reception network, and mobile reception devices.

Technical Solution

In order to achieve the technical object, a broadcast signal receiving method according to an embodiment of the present invention includes: receiving a broadcast signal; parsing service list table (SLT) information included in the broadcast signal; obtaining service layer signaling (SLS) information based on the SLT information; obtaining app signaling information based on the SLT information or the SLS information, the app signaling information including entry page information for an entry page that is loaded for an app-based service startup; and controlling an app based on the app signaling information.

In the broadcast signal receiving method according to the embodiment of the present invention, the entry page information includes entry URL information of the entry page of the app, required capability information indicating a capability of a device required for rendering the entry page, valid start (validFrom) information indicating a time at which the entry page is loaded, valid end (ValidFrom) information indicating a time at which the entry page is unloaded, and app context identifier information for assigning a context identifier to the app.

In the broadcast signal receiving method according to the embodiment of the present invention, the entry URL information is signaled in an infrequent change mode in which entry URL is changed when the entry page includes a container for loading subpages and a version of the entry page is changed or signaled in a frequent change mode in which the entry URL is changed based on a change in entry page.

In the broadcast signal receiving method according to the embodiment of the present invention, the app signaling information is received while being included in the SLS information or received in an HTTP response of an HTTP request for URL information included in the SLT information.

In the broadcast signal receiving method according to the embodiment of the present invention, the entry page information further includes LCT channel information for carrying an app file for the app.

In the broadcast signal receiving method according to the embodiment of the present invention, the SLS information includes EFDT information for providing information on file delivery data and the EFDT information includes app context identifier information for a delivery file, and the app provides an app based service based on the app context identifier.

In the broadcast signal receiving method according to the embodiment of the present invention, whether the app file is associated with the app providing the app based service is determined based on the app context identifier information included in the entry page information and the app context identifier information included in the EFDT information.

In order to achieve the technical object, a broadcast signal receiver according to an embodiment of the present invention includes: a communication unit receiving a broadcast signal; a memory storing data; and a processor controlling the communication unit and the memory, in which the broadcast signal receiver receives the broadcast signal, parses service list table (SLT) information included in the broadcast signal, obtains service layer signaling (SLS) information based on the SLT information, obtains app signaling information based on the SLT information or the SLS information, in which the app signaling information may include entry page information for an entry page that is loaded for an app-based service startup, and control an app based on the app signaling information.

Advantageous Effects

The present invention processes data according to the characteristics of a service and controls Quality of Service (QoS) for each service or service component, thereby providing various broadcast services.

The present invention transmits various broadcast services through the same Radio Frequency (RF) signal band, thereby achieving transmission flexibility.

The present invention is capable of providing a method and an apparatus for transmitting and receiving a broadcast signal by which a digital broadcast signal may be received without an error even with a mobile reception device or in an indoor environment.

The present invention effectively supports future broadcast services in an environment supporting future hybrid broadcast systems employing a terrestrial broadcast network and Internet network.

In what follows, additional effects brought by the present invention will be described together with a structure of the present invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 illustrates an entry URL signaling architecture according to an embodiment of the present invention.

FIG. 7 illustrates an entry URL signaling split architecture according to an embodiment of the present invention.

FIG. 8 illustrates entry location signaling information according to an embodiment of the present invention.

FIG. 9 illustrates HTML entry pages location description (HELD) information according to an embodiment of the present invention.

FIG. 10 illustrates EFDT information according to an embodiment of the present invention.

FIG. 11 illustrates an HTTP response header according to an embodiment of the present invention.

FIG. 12 illustrates a method for controlling an application of a broadcast receiver according to an embodiment of the present invention.

FIG. 13 illustrates a method for controlling an application of a broadcast receiver according to an embodiment of the present invention.

FIG. 14 illustrates a configuration of a broadcast signal transmitter/receiver according to an embodiment of the present invention.

FIG. 15 illustrates a broadcast signal receiving method according to an embodiment of the present invention.

MODE FOR INVENTION

In what follows, preferred embodiments of the present invention are described in detail with reference to appended drawings. Detailed descriptions with reference to appended drawings are not necessarily limited only to the embodiments which may be implemented according to the present invention but rather intended to describe preferred embodiments of the present invention. The following descriptions given below include specific details for a thorough understanding of the present invention. However, it should be clearly understood by those skilled in the art that the present invention may be implemented without involving the specific details.

Most of the terms used in the present invention have been chosen among those terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMP-DUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

A broadcaster may execute and control an application of a receiver through a broadcast network. The application represents a collection of interrelated documents that perform functions such as providing interactive contents or inserting targeted advertisements. The application may be referred to as an app below. The documents of the app may include at least one of HTML, JavaScript, CSS, XML, and a multimedia file. The app may access another other than a part of the app itself. Hereinafter, an app signaling method for controlling the application by a receiving side will be described.

The service may include at least one app-based app enhancement. For example, a linear service may include the app-based enhancement providing an interactive viewing experience for inserting the targeted advertisements and reinforcing a video/audio program.

The linear service may signal URL of a homepage (entry point) of an associated enhancement. Other documents of the enhancement may be accessed by the API starting from the entry point.

Fixed URL and variable URL may be used as the entry point. The URL of the homepage may be signaled in order to control the app. The URL may be fixed or varied. An event may be defined so that a container page changes a function. One URL may be signaled at a time. When new URL is signaled, a new page is may be loaded to a browser and the new page may be substituted with a previous page of the browser.

The URL of the homepage/entry point may be included in an application signaling table (AST). The AST may be used for signaling properties of the application including the URL of the homepage/entry point.

The app enhancement may provide an "entry page" loaded to start the enhancement by "entry URL". Other documents of the enhancement may be accessed by using an HTML5 configuration or HTML5 API.

The entry URL of the entry page may be signaled for the service and the entry URL may be signaled only once at a time. Further, only one page may be loaded at a time.

The entry URL may be changed from time to time.

As an embodiment, the entry URL may be very infrequently changed. For example, the entry page may include a container and the container may sequentially load other "enhancement pages". As an embodiment, the container may include at least one iFrame. Loading of different enhancement pages may be driven by the event included in the broadcast signal. In this case the "Entry URL" would typically change only when a new version of the service page is desired. A signaling method of the entry URL may be referred to as an infrequent change mode.

As another embodiment, the entry URL may be frequently changed. For example when an "Entry Page" is an "Enhancement Page" which routinely change at show and/or interstitial boundaries. The signaling method of the entry URL may be referred to as a frequent change mode.

When the entry page is signaled, the service may be selected or when the entry URL is changed to a new value, the entry page may be loaded. When the entry URL is changed to a null value, the null value of the entry URL may indicate that a new active page is unloaded.

FIG. 6 illustrates an entry URL signaling architecture according to an embodiment of the present invention.

FIG. 6 illustrates an infrequent mode and a frequent mode to signal entry URL.

FIG. 6(a) illustrates an embodiment of loading infrequent URL change.

In the case of the infrequent mode, an entry page may include a container and the container may include an enhancement page. The container may sequentially load different sub-pages. Therefore, the URL of the entry page need not be changed frequently. The reason is that when an enhancement service is changed, enhancement pages included in the entry page may be changed and the entry page itself need not be changed. As described above, the entry URL may be typically changed only when a version of the entry page is changed.

FIG. 6(b) illustrates an embodiment of loading frequent URL change.

In the case of the frequent mode, the entry page corresponds to the enhancement page. In this case, a show and a program may be changed or the entry page may be routinely changed on interstitial boundaries of the show and the program.

In FIG. 6, the entry URL and/or the change of the entry URL may be indicated by signaling information of a broadcast signal. In the embodiment of FIG. 6, a browser may be a browser provided by a broadcaster. The browser of FIG. 6 may be referred to as an application or app in this specification.

FIG. 7 illustrates an entry URL signaling split architecture according to an embodiment of the present invention.

FIG. 7 illustrates an embodiment in which a browser not provided by the broadcaster is used unlike FIG. 6. That is, in FIG. 7, the entry page is accessed by not the app of the broadcaster but a general browser (off the shelf browser). In addition, the entry page may be provided to a user by the off the shelf browser.

The entry URL is signaled by two schemes, and as a result, efficient signaling may be performed. That is, when the enhancement service has a lot of contents or contents which need to be frequently changed, the entry URL is signaled in the infrequent mode to reduce the number of signaling times or a burden. When the enhancement service has fixed or a small number of contents, the entry URL may be signaled in the frequent mode. Therefore, the enhancement service is dynamically provided and a processing burden of a receiver is reduced to help the receiver to rapidly provide the service.

FIG. 8 illustrates entry location signaling information according to an embodiment of the present invention.

FIG. 8 illustrates entry location signaling information to signal the entry URL. As a table type of FIG. 8, the entry location signaling information may be referred to as an entry location signaling table. In particular, FIG. 8 illustrates an embodiment in which the entry page is an HTML page and the entry page signaling information of FIG. 8 may be referred to as an HTML pages entry location signaling table (HLST). A description of sub information included in the entry location signaling information of FIG. 8 is as follows.

The entry location signaling information of FIG. 8 may be included in app signaling information or may correspond to an embodiment of the app signaling information.

Entry page collection (EntryPageCollection): including HTML entry page collection element/sub information.

HTML entry page (HTMLEntryPage): including properties of the entry page.

@specVersion: as spec. version information, @specVersion indicates a specification version for the HTML page. As an attribute provided for extensibility of a standard, @specVersion may indicate a currently released specification as 3.0.

@requiredCapabilities: as request capability information, @requiredCapabilities indicates device capability required for meaningful rendering of the entry page.

EntryLocation: entry location information, a URL path component for an entry point of HTML pages. When the URL is changed, EntryLocation indicates new URL for an available entry location. When two entry locations are shown, one may be used for a broadcast transport and the other one may be used for a broadband transport.

@transport: as transport path information, @transport indicates a broadcast or broadband transport path.

TimeSlotInfo: as time slot information, TimeSlotInfo indicates a time interval which may be acquired by the app.

@timeslot_start: As time slot start information, @timeslot_start indicates a start time of a time slot.

@timeslot_length: As time slot length information, @timeslot_length indicates a length of the time slot and indicates the length of the time slot, for example, in seconds.

@acquisition_time: As acquisition time information, @acquisition_time indicates a minimum time interval required for guaranteeing acquisition of the app.

@repeat_period: As repeat period information, @repeat_period indicates a repeat period of the time slot. @repeat_period may indicate the repeat period of the time slot in seconds.

validFrom: As valid start information, validFrom indicates a time when HTML page collection starts to be valid.

validUntil: As valid end information, validUntil indicates a time when validation of the HTML page collection ends.

CacheRecommendation: CacheRecommendation indicates whether caching of the HTML page accessed through the entry location information is recommended. For example, 0 indicates that caching is recommended and 1 indicates that caching is not recommended.

FIG. 9 illustrates HTML entry pages location description (HELD) information according to an embodiment of the present invention.

The HELD information illustrates another embodiment of the entry location signaling information illustrated in FIG. 8. Further, the HELD is included in app signaling information, that is, an application signaling table (AST) or corresponds to another embodiment of the app signaling information. The description of the sub information included in the HELD information is as follows.

HELD: including HTML entry page collection elements.

HTMLEntryPage: HTML entry page information includes properties of the entry page.

@requiredCapabilities: Required capability information indicates a capability of a device required for meaningful rendition of the entry page.

@appRendering: App rendering information indicates that the app of the broadcaster requests rendering a video of the service in a linear service.

@entryURL: Entry URL information indicates the URL of the entry page of the application.

@alternateEntryURL: Alternate entry URL information indicates an alternate broadband path for the same HTML page indicated by the entry URL information.

@packageURL: When page URL information exists, @packageURL indicates the URL of a page including the entry page, which has a content-location value within the entry URL.

@validFrom: The valid start information indicates a date and a time when the @entryURL page is loaded when the service is selected. The @entryURL page may be loaded after a predetermined time from the date and time indicated by the valid start information. The @entryURL page may be loaded up to the time indicated by the valid end information.

@validUntil: The valid end information indicates a date and a time when the app is unloaded in @entryURL.

AppContextID: App context ID information indicates a context ID for the app. The app may access application files having the same app context ID.

CoupledServices: Providing a space-separated list of linear services sharing a common broadcaster application.

LCT: indicates an LCT channel carrying application files.

@tsiRef: TSI reference information a TSI value of the LCT channel within a ROUTE session.

DistributionWindow: Distribution window information indicates a broadcast transmission interval of an application file or package.

@startTime: Start time information indicates a start of a transmission interval.

@endTime: End time information indicates an end of the transmission interval.

FileURL: File URL information indicates the URL of the application file or package.

FIG. 10 illustrates EFDT information according to an embodiment of the present invention.

As illustrated in FIG. 4, S-TSID information included in SLS information may provide an access related parameter for a transmission section carrying the service. The S-TSID information includes an LS element and the LS element describes information on the LCT channel in which components of the service are delivered. In the information, an SrcFlow element, that is, source flow information may describe a source flow of a ROUTE protocol. A source protocol of ROUTE may be used for transmitting a delivery object and at least one source flow may be established within one ROUTE session.

The SrcFlow element, that is, the source flow information includes an EFDT element. The EFDT element represents an extended file delivery table (FDT) instance. FIG. 10 illustrates an embodiment of the EFDT information included in the source flow information. The EFDT element is embedded to a source flow element. A separate delivery object referenced by signaling metadata and carried by the same ROUTE session and constituent LCT channel is described by the EFDT.

The delivery object may be delivered in a file mode. In this case, the delivery object represents a file or a byte range of the file.

As illustrated in FIG. 10, the EFDT provides a detail of file delivery data in the form of an EFDT instance, including nominal FDT instance parameters. The description of information included in the EFDT information is as follows.

@version: Version information represents a version of an EFDT instance descriptor.

@maxExpiresDelta: Expire time information indicates a time interval used for extracting an expiration time of the EFDT.

@maxTransportSize: Maximum transport size information indicates a maximum transport size of a predetermined object described by the EFDT.

FileTemplate: File template information describes a means for generating file URL (for example, content-location and attribute of the FDT).

FDTParameters: FDT parameter information indicates a predetermined parameter permitted in a file delivery over unidirectional transport (FLUTE) FDT instance.

AppContextID: App context ID information indicates a context ID of a file or an HTML page which may be accessed by the HTML page. An application (for example, HTML page) is allowed to access a file having the same context ID with the application. The app context ID information may be referred to as an app context identifier or an application context identifier.

The Application Context Identifier is a unique URI that determines which resources are provided to an associated Broadcaster Application by the Receiver. The resources may be associated with a plurality of app context identifiers. The broadcaster application may be associated only with one app context identifier.

FIG. 11 illustrates an HTTP response header according to an embodiment of the present invention.

When an application related file is transmitted to the broadband, the broadcaster may add and transmit the app context identifier (AppContextID) to an HTTP header as illustrated in FIG. 11. That is, even in the case of a broadband file delivery, app context information for the corresponding application file may be transmitted while being included in a header.

FIG. 12 illustrates a method for controlling an application of a broadcast receiver according to an embodiment of the present invention.

FIG. 12 illustrates a method for controlling an application of the receiver when the app context identifier is not used. As described above, the app context identifier may represent origins of the app and the app related file.

A broadcast receiver may determine whether to access the file by using the origin of the file when there is no app context identifier. However, formats for the origin in a case of signaling the information on the app by broadcasting and a case of signaling the information on the app by the broadband may be different from each other.

In the embodiment of FIG. 12, in the case of signaling the information on the app by the broadcasting, the origin of the entry page may become "atsc://www.nbc.com". Therefore, the broadcast receiver may recognize that a file of which origin is "atsc://www.nbc.com" is a file for the corresponding app and provide the file as the app. Further, in the case of signaling the information on the app by the broadband, the origin of the entry page may become "http://www.nbc.com". Therefore, the broadcast receiver may recognize that a file of which origin is "http://www.nbc.com" is a file for the corresponding app and provide the file as the app.

The broadcast receiver may not provide a file of which origin is "http://www.nbc.com", which is received by another broadband to an app which operates by broadcast signaling because the origin of the app which operates by the broadcast signaling is "atsc://www.nbc.com". Further, the broadcast receiver may not provide a file of which origin is "atsc://www.nbc.com", which is received by broadcasting to an app which operates by broadband signaling because the origin of the app which operates by the broadband signaling is "http://www.nbc.com".

That is, in the embodiment of FIG. 12, when the origin is verified only through the origin on a front surface of the file, URL schemes of the broadcast signaling and the broadband signaling are different from each other, and as a result, the application and the file for the same service may not be recognized as the same origin.

FIG. 13 illustrates a method for controlling an application of a broadcast receiver according to an embodiment of the present invention.

FIG. 13 illustrates a method for controlling an application of the receiver when the app context identifier is used. As described above, the app context identifier may represent the origins of the app and the app related file.

When the file origin is distinguished as the origin as illustrated in FIG. 12, a problem may occur, in which the origins may not be normally recognized even between the application and the file having the same origin due to a difference in format of the origin. Therefore, in the present invention, the app context identifier is signaled as illustrated in FIGS. 9 to 11.

The broadcast receiver may identify the origins of the app and the file by using the app context identifier. In FIG. 12 the app context identifier may become "nbc/app". Since all of a broadcast signaling/app, a file delivered by the broadcasting, a broadband signaling/app, and a file delivered by the broadband include the same app context identifier, it can be seen that the apps/files including the same app context identifier are associated.

In the case of signaling the app by the broadcasting, the HELD information may include the app context identifier as illustrated in FIG. 9. The HELD information may be transmitted while being included in the SLS information. When the app related file is transmitted by the broadcasting, the EFDT may include the app context identifier for the file as illustrated in FIG. 10. When the app is signaled by the broadband, the SLS information may be transmitted in response to an HTTP request. URL information for the HTTP request of the HELD information may be transmitted while being included in the SLT.

FIG. 14 illustrates a configuration of a broadcast signal transmitter/receiver according to an embodiment of the present invention.

In FIG. 14, a broadcast signal receiver/transmitter 14000 may include a communication unit 14010, a processor 14020, and a memory 14030.

The communication unit 14010 is connected with the processor 14020 to transmit and receive a radio signal. The communication unit 14010 may transmit a signal by up-converting data received from the processor 14020 to a transmission/reception band. The communication unit 14010 may down-convert the received data and deliver the down-converted data to the processor 14020.

The processor 14020 is connected with the communication unit 14010 to implement a broadcast signal processing technology according to an ATSC 3.0 system. The processor 14020 may be configured to perform operations in accordance with various embodiments of the present invention in accordance with the aforementioned drawings and descriptions. Further, at least one of a module that implements the operation of the broadcast signal transmitter/receiver 14000 according to various embodiments of the present invention may be stored in the memory 14030 and executed by the processor 14020.

The memory 14030 is connected with the processor 14020 to store various pieces of information for driving the processor 14020. The memory 14030 is included in the processor 14020 or installed outside the processor 14020 to be connected with the processor 14020 by a known means. A detailed configuration of the broadcast signal transmitter/receiver 28200 may be implemented such that matters described in various embodiments of the present invention described above are applied independently or two or more embodiments are simultaneously applied.

FIG. 15 illustrates a broadcast signal receiving method according to an embodiment of the present invention.

The broadcast signal receiving method of FIG. 15 may be performed by the broadcast signal receiver of FIG. 14.

The broadcast signal receiver may receive the broadcast signal (S15010). The broadcast signal may include SLT information and SLS information as described with reference to FIGS. 1 to 5.

The broadcast signal receiver may parse the SLT information included in the broadcast signal (S15020). The SLT information allows the receiver to generate a service list via fast channel scan and provides access information for locating the SLS information. The SLT information includes bootstrap information, which allows the receiver to acquire service layer signaling (SLS) information for each service.

The broadcast signal receiver may acquire the SLS information based on the SLT information (S15030). The SLS information as signaling information for describing a characteristic of the service may include receiver capability information for providing information for acquiring the service and the service component of the service or significantly reproducing the service.

The broadcast signal receiver may acquire the app signaling information based on the SLT information or the SLS information (S15040). The app signaling information includes entry page information for the entry page loaded for starting an app based service. The app signaling information may be included in the SLS information or received as an HTTP response to an HTTP request for URL information included in the SLT information.

The broadcast signal receiver may control the app in the app signaling information (S15050). The broadcast signal receiver loads the entry page by accessing entry URL information included in the entry page information to provide the app based service.

The entry page information includes required capability information indicating a capability of a device required for rendering the entry page, valid start (validFrom) information indicating a time at which the entry page is loaded, valid end (ValidUntil) information indicating a time at which the entry page is unloaded, and app context identifier information for assigning a context identifier to the app. Further, the entry page information may further include LST channel information for carrying the app file for the app.

The entry URL information may be signaled in an infrequent change mode in which entry URL is changed when the entry page includes a container for loading subpages and a version of the entry page is changed or signaled in a frequent change mode in which the entry URL is changed based on a change in entry page.

The SLS information may include EFDT information for providing information on file delivery data. The EFDT information may include app context identifier information for a delivery file. The receiver or the app of the receiver may receive the app based service based on the app context identifier. Whether the app file is associated with the app providing the app based service may be determined based on the app context identifier information included in the entry page information and the app context identifier information included in the EFDT information.

As another embodiment, whether the app file is associated with the app may be provided to a broadcast signal transmitting method of a broadcast signal transmitter. The broadcast signal transmitting method may include generating the SLS information for the broadcast service, generating the SLT information for the service included in the broadcast signal, and transmitting the broadcast signal including the SLT information and the SLS information. In addition, the broadcast signal transmitter may transmit the app signaling information for controlling the app as described above. A data structure and a reverse process of the receiving method described in FIG. 15 may be applied to the transmitting method of the broadcast signal transmitter.

Each of the steps described in the above embodiments may be performed by hardware/processors. Each module/block/unit described in the above embodiments may operate as the hardware/processor. Further, the methods proposed by the present invention may be executed as the codes. The code may be written to a storage medium readable by the processor, and thus readable by a processor provided by the apparatus.

Although the drawings have been described for the sake of convenience of explanation, it is also possible to design a new embodiment to be implemented by merging the embodiments described in each drawing. Configurations and methods of the described embodiments may not be limitedly applied to the apparatus and the method according to the present invention, but all or some of the respective embodiments may be selectively combined and configured so as to be variously modified.

Further, although the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

It will be understood by those skilled in the art that various changes and modifications can be made therein without departing from the spirit or scope of the invention. Accordingly, it is intended that the present invention cover the modifications and variations of the present invention provided they come within the scope of the appended claims and their equivalents.

In the present specification, all apparatus and method inventions are herein mentioned and descriptions of both apparatus and method inventions can be supplemented and applied to each other.

MODE FOR INVENTION

Various embodiments are described in a best mode for carrying out the present invention.

INDUSTRIAL APPLICABILITY

The present invention is used in a series of broadcast signal transmission/reception fields.

It will be apparent to those skilled in the art that various changes and modifications can be made therein without departing from the spirit or scope of the invention. Accordingly, it is intended that the present invention cover the modifications and variations of the present invention provided they come within the scope of the appended claims and their equivalents.

The invention claimed is:

1. A broadcast signal receiving method comprising:
receiving a broadcast signal including service layer signaling (SLS) information;
parsing the SLS information;
obtaining entry page location information for loading and unloading an application from the SLS information, the entry page location information including first information representing a uniform resource locator (URL) of an entry page of the application, second information representing a context identifier for the application, third information representing that the entry page is to be loaded at date and time and fourth information representing that the entry page is to be unloaded at date and time; and
loading the application based on the entry page location information.

2. The broadcast signal receiving method of claim 1,
wherein the entry page location information further includes required capability information for a capability of a device required for rendering the entry page, valid start (validFrom) information for time at which the entry page is loaded, valid end (ValidUntil) information for time at which the entry page is unloaded, and application context identifier information for an application context identifier assigned to the application wherein a file of the application context identifier can be accessed by another application having the application context identifier.

3. The broadcast signal receiving method of claim 1,
wherein the entry page location information is included in the SLS information or received in an HTTP (Hypertext Transfer Protocol) response based on an HTTP request for URL information included in service list table (SLT) information.

4. The broadcast signal receiving method of claim 1, the broadcast signal receiving method further comprising:
displaying the entry page, that is obtained based on the first information, during specific time that is established based on the third information and the fourth information.

5. The broadcast signal receiving method of claim 2,
wherein the first information is signaled in an infrequent change mode in which entry URL is changed when the entry page includes a container for loading subpages and a version of the entry page is changed, or is signaled in a frequent change mode in which the entry URL is changed based on a change in entry page.

6. The broadcast signal receiving method of claim 2,
wherein the entry page location information further includes layered coding transport (LCT) channel information for carrying an application file for the application.

7. The broadcast signal receiving method of claim 4,
wherein the SLS information includes EFDT (Extended File Delivery Table) information and the EFDT information includes application context identifier information for a delivery file, and
wherein whether the application file is associated with the application providing an application based service is determined based on the application context identifier information included in the entry page information and the application context identifier information included in the EFDT information.

8. A broadcast signal receiver comprising:
a tuner configured to receive a broadcast signal including service layer signaling (SLS) information; and
a processor configured to parse the SLS information,
obtain entry page location information for loading and unloading an application from the SLS information, the entry page location information including first information representing a uniform resource locator (URL) of an entry page of the application, second information representing a context identifier for the application, third information representing that the entry page is to be loaded at date and time and fourth information representing that the entry page is to be unloaded at date and time, and load the application based on the entry page location information.

9. The broadcast signal receiver of claim 8, wherein the entry page location information further includes required capability information for a capability of a device required for rendering the entry page, valid start (validFrom) information for time at which the entry page is loaded, valid end (ValidUntil) information for time at which the entry page is unloaded, and application context identifier information for an application context identifier assigned to the application wherein a file of the application context identifier can be accessed by another application having the application context identifier.

10. The broadcast signal receiver of claim 8, wherein the entry page location information is included in the SLS information or received in an HTTP (Hypertext Transfer Protocol) response based on an HTTP request for URL information included in service list table (SLT) information.

11. The broadcast signal receiver of claim 8, the broadcast signal receiver further comprising:

a display unit configured to display the entry page, that is obtained based on the first information, during specific time that is established based on the third information and the fourth information.

12. The broadcast signal receiver of claim 9, wherein the first information is signaled in an infrequent change mode in which entry URL is changed when the entry page includes a container for loading subpages and a version of the entry page is changed, or is signaled in a frequent change mode in which the entry URL is changed based on a change in entry page.

13. The broadcast signal receiver of claim 9, wherein the entry page location information further includes layered coding transport (LCT) channel information for carrying an application file for the application.

14. The broadcast signal receiver of claim 11, wherein the SLS information includes EFDT (Extended File Delivery Table) information and the EFDT information includes application context identifier information for a delivery file, and wherein whether the application file is associated with the application providing an application based service is determined based on the application context identifier information included in the entry page information and the application context identifier information included in the EFDT information.

15. A method for transmitting a broadcast signal, the method comprising:

generating service layer signaling (SLS) information including entry page location information for loading and unloading an application, the entry page location information including first information representing a uniform resource locator (URL) of an entry page of the application, second information representing a context identifier for the application, third information representing that the entry page is to be loaded at date and time and fourth information representing that the entry page is to be unloaded at date and time;

encoding service data and the SLS information; and transmitting the broadcast signal including the service data and the SLS information.

16. An apparatus for transmitting a broadcast signal, the apparatus comprising:

a generator configured to generate service layer signaling (SLS) information including entry page location information for loading and unloading an application, the entry page location information including first information representing a uniform resource locator (URL) of an entry page of the application, second information representing a context identifier for the application, third information representing that the entry page is to be loaded at date and time and fourth information representing that the entry page is to be unloaded at date and time;

an encoder configured to encode service data and the SLS information; and a transmitter configured to transmit the broadcast signal including the service data and the SLS information.

* * * * *